(12) United States Patent
Tillotson et al.

(10) Patent No.: US 7,519,719 B2
(45) Date of Patent: Apr. 14, 2009

(54) AUTOMATIC CREATION OF PROTOCOL DEPENDENT CONTROL PATH FOR INSTRUMENT APPLICATION

(75) Inventors: Timothy Nephi Tillotson, Heber, UT (US); Sara Ting, Cupertino, CA (US); Nathan A. Berg, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 846 days.

(21) Appl. No.: 10/824,683

(22) Filed: Apr. 15, 2004

(65) Prior Publication Data

US 2005/0267977 A1 Dec. 1, 2005

(51) Int. Cl.
*G06F 15/16* (2006.01)

(52) U.S. Cl. .................. 709/230; 709/217; 709/220; 709/224; 709/227

(58) Field of Classification Search .......... 709/228, 709/230, 202, 220, 224, 227, 217, 223
See application file for complete search history.

(56) References Cited

U.S. PATENT DOCUMENTS

| | | | |
|---|---|---|---|
| 4,937,825 A * | 6/1990 | Ballard et al. ............... 714/712 |
| 5,491,693 A * | 2/1996 | Britton et al. ............... 370/401 |
| 5,515,508 A * | 5/1996 | Pettus et al. ................ 709/203 |
| 5,526,483 A * | 6/1996 | French et al. ................. 714/4 |
| 5,537,417 A * | 7/1996 | Sharma et al. .............. 709/228 |
| 5,546,584 A * | 8/1996 | Lundin et al. ............... 719/315 |
| 5,706,434 A * | 1/1998 | Kremen et al. .............. 709/218 |
| 5,719,942 A * | 2/1998 | Aldred et al. ............... 709/228 |
| 5,764,915 A * | 6/1998 | Heimsoth et al. ........... 709/227 |
| 5,809,235 A * | 9/1998 | Sharma et al. .............. 709/230 |
| 5,872,919 A * | 2/1999 | Wakeland .................. 709/230 |
| 5,898,838 A * | 4/1999 | Wagner .................... 709/224 |
| 5,937,165 A * | 8/1999 | Schwaller et al. ........... 709/224 |
| 5,958,010 A * | 9/1999 | Agarwal et al. ............. 709/224 |
| 6,003,084 A * | 12/1999 | Green et al. ................ 709/227 |
| 6,011,803 A * | 1/2000 | Bicknell et al. ............. 370/467 |
| 6,032,203 A * | 2/2000 | Heidhues .................... 710/11 |
| 6,038,603 A * | 3/2000 | Joseph ...................... 709/228 |
| 6,055,575 A * | 4/2000 | Paulsen et al. .............. 709/229 |
| 6,178,449 B1* | 1/2001 | Forman et al. .............. 709/224 |
| 6,226,676 B1* | 5/2001 | Crump et al. ............... 709/227 |

(Continued)

OTHER PUBLICATIONS

U.S. Appl. No. 10/825,465, filed Apr. 15, 2004, Timothy Nephi Tillotson et al.

(Continued)

*Primary Examiner*—Michael Won

(57) ABSTRACT

A method and system for creating a protocol dependent control path for instrument applications. In a representative embodiment, identifications of a client, of an instrument application, of a client specific protocol, and of an application specific protocol are obtained. The client is configured to invoke the application and to communicate using the client specific protocol. The application is configured to communicate using the application specific protocol. Then a control path between the client and the application is automatically created. In another representative embodiment, a system for creating the protocol dependent control path for instrument applications includes a management logic module configured to obtain identification of the client, to obtain identification of the instrument application, to obtain identification of the client specific protocol, to obtain identification of the application specific protocol, and to automatically create the control path between the client and the application.

20 Claims, 9 Drawing Sheets

U.S. PATENT DOCUMENTS

| | | | |
|---|---|---|---|
| 6,247,060 B1 * | 6/2001 | Boucher et al. | 709/238 |
| 6,266,698 B1 * | 7/2001 | Klein et al. | 709/227 |
| 6,311,222 B1 * | 10/2001 | Crump et al. | 709/246 |
| 6,397,359 B1 * | 5/2002 | Chandra et al. | 714/712 |
| 6,405,254 B1 * | 6/2002 | Hadland | 709/230 |
| 6,434,617 B1 * | 8/2002 | Clough et al. | 709/227 |
| 6,584,499 B1 * | 6/2003 | Jantz et al. | 709/220 |
| 6,611,862 B2 * | 8/2003 | Reisman | 709/217 |
| 6,625,648 B1 * | 9/2003 | Schwaller et al. | 709/224 |
| 6,651,099 B1 * | 11/2003 | Dietz et al. | 709/224 |
| 6,665,724 B2 * | 12/2003 | Lawrence | 709/230 |
| 6,665,725 B1 * | 12/2003 | Dietz et al. | 709/230 |
| 6,690,304 B1 * | 2/2004 | Shirokura et al. | 341/50 |
| 6,735,630 B1 * | 5/2004 | Gelvin et al. | 709/224 |
| 6,763,380 B1 * | 7/2004 | Mayton et al. | 709/224 |
| 6,772,216 B1 * | 8/2004 | Ankireddipally et al. | 709/230 |
| 6,785,722 B2 * | 8/2004 | Vuong et al. | 709/223 |
| 6,789,117 B1 * | 9/2004 | Joiner et al. | 709/224 |
| 6,832,260 B2 * | 12/2004 | Brabson et al. | 709/230 |
| 6,901,442 B1 * | 5/2005 | Schwaller et al. | 709/224 |
| 6,954,789 B2 * | 10/2005 | Dietz et al. | 709/224 |
| 6,965,930 B1 * | 11/2005 | Arrowood et al. | 709/223 |
| 7,024,474 B2 * | 4/2006 | Clubb et al. | 709/223 |
| 7,047,293 B2 * | 5/2006 | Motoyama et al. | 709/224 |
| 7,089,313 B2 * | 8/2006 | Lee et al. | 709/227 |
| 7,222,152 B1 * | 5/2007 | Thompson et al. | 709/202 |
| 7,228,355 B2 * | 6/2007 | Dowling | 709/230 |
| 2002/0002627 A1 * | 1/2002 | Stead et al. | 709/250 |
| 2002/0042831 A1 * | 4/2002 | Capone et al. | 709/230 |
| 2002/0120760 A1 * | 8/2002 | Kimchi et al. | 709/230 |
| 2002/0124108 A1 * | 9/2002 | Terrell et al. | 709/245 |
| 2002/0133588 A1 * | 9/2002 | Doyle et al. | 709/224 |
| 2002/0156886 A1 * | 10/2002 | Krieski et al. | 709/224 |
| 2002/0161907 A1 * | 10/2002 | Moon | 709/230 |
| 2005/0198277 A1 * | 9/2005 | Wada et al. | 709/224 |
| 2007/0112969 A1 * | 5/2007 | Wang et al. | 709/230 |

OTHER PUBLICATIONS

U.S. Appl. No. 10/824,973, filed Apr. 15, 2004, Timothy Nephi Tillotson et al.

U.S. Appl. No. 10/825,466, filed Apr. 15, 2004, Timothy Nephi Tillotson et al.

U.S. Appl. No. 10/824,971, filed Apr. 15, 2004, Timothy Nephi Tillotson et al.

* cited by examiner

AUTOMATIC CREATION OF PROTOCOL DEPENDENT CONTROL PATH FOR INSTRUMENT APPLICATION

BACKGROUND

Instruments were historically designed and built to perform a rather limited and well specified set of measurements for fairly well defined applications in localized environments for a specific type of user. However, the advent of large scale integrated circuit technology has provided instrument designers with the ability to cost effectively add more and more capabilities to an instrument.

Many instruments today are now designed to be controlled by a computer, and this computer may be located remotely from the instrument. Instruments have moved from the ability to make, for example, simple voltage and/or current measurements by flipping a switch to the ability to perform multiple tests of multiple types at a high rate of speed without human interaction. In another aspect, the functionality of instruments is becoming more and more dynamic. A user can now purchase options for an instrument that can be turned on and off as, for example, the user pays for licenses for various functionality and/or licenses expire. Standard control and interconnect technologies and protocols have been developed for this combined computer/instrument system.

Modern instruments can now provide a variety of measurement capabilities which are controlled by software programs written for and resident on the instrument using a set of software routines. These routines are often a part of a software suite of functions having a standard format. Such routines are referred to as Application Program(ming) Interface (API) functions. In computers, the operating system, for example, has APIs for a variety of tasks including disk and file control. API's are written and used in order to provide portable code and are generally available for use by application programmers. Application programmers specify the commands (calls) and the required parameters of the commands necessary to perform a needed task. They do not have to address the details of implementation, which may vary from system to system. In effect, the API's form a high-level programming language.

Software control of instruments is similarly effected by means of API's written for each instrument. Again, the instrument application developer can write portable, high-level software without having to deal with the more detailed, lower-level implementation details which are more involved and which are instrument specific. The set of API's developed for any given instrument is referred to as the native instrument API's. Programming environments with standard protocols, such as .NET which is an open software standard initially developed by Microsoft, are now used in the creation and running of modern instrument applications.

The use of standard programming and runtime protocol environments has resulted, to some extent, in the ability to reuse prior developed software with the resultant savings in development expense and a reduction in development time with hopefully more reliable software.

SUMMARY

Methods and systems for creating a protocol dependent control path for instrument applications are disclosed herein. In a representative embodiment, identifications of a client, of an instrument application, of a client specific protocol, and of an application specific protocol are obtained. The client is configured to invoke the application and to communicate using the client specific protocol. The application is configured to communicate using the application specific protocol. Then a control path between the client and the application is automatically created.

In another representative embodiment, a system for creating the protocol dependent control path for instrument applications includes a management logic module configured to obtain identification of the client, to obtain identification of the instrument application, to obtain identification of the client specific protocol, to obtain identification of the application specific protocol, and to automatically create the control path between the client and the application. The client is configured to invoke the application and to communicate using a client specific protocol. The application is configured to communicate using a application specific protocol, wherein the application specific protocol differs from the client specific protocol.

Other aspects and advantages of the present representative embodiments will become apparent from the following detailed description, taken in conjunction with the accompanying drawings, illustrating by way of example the principles of the representative embodiments.

BRIEF DESCRIPTION OF THE DRAWINGS

The accompanying drawings provide visual representations which will be used to more fully describe various representative embodiments and can be used by those skilled in the art to better understand them and their inherent advantages. In these drawings, like reference numerals identify corresponding elements.

DETAILED DESCRIPTION

Figure 1:
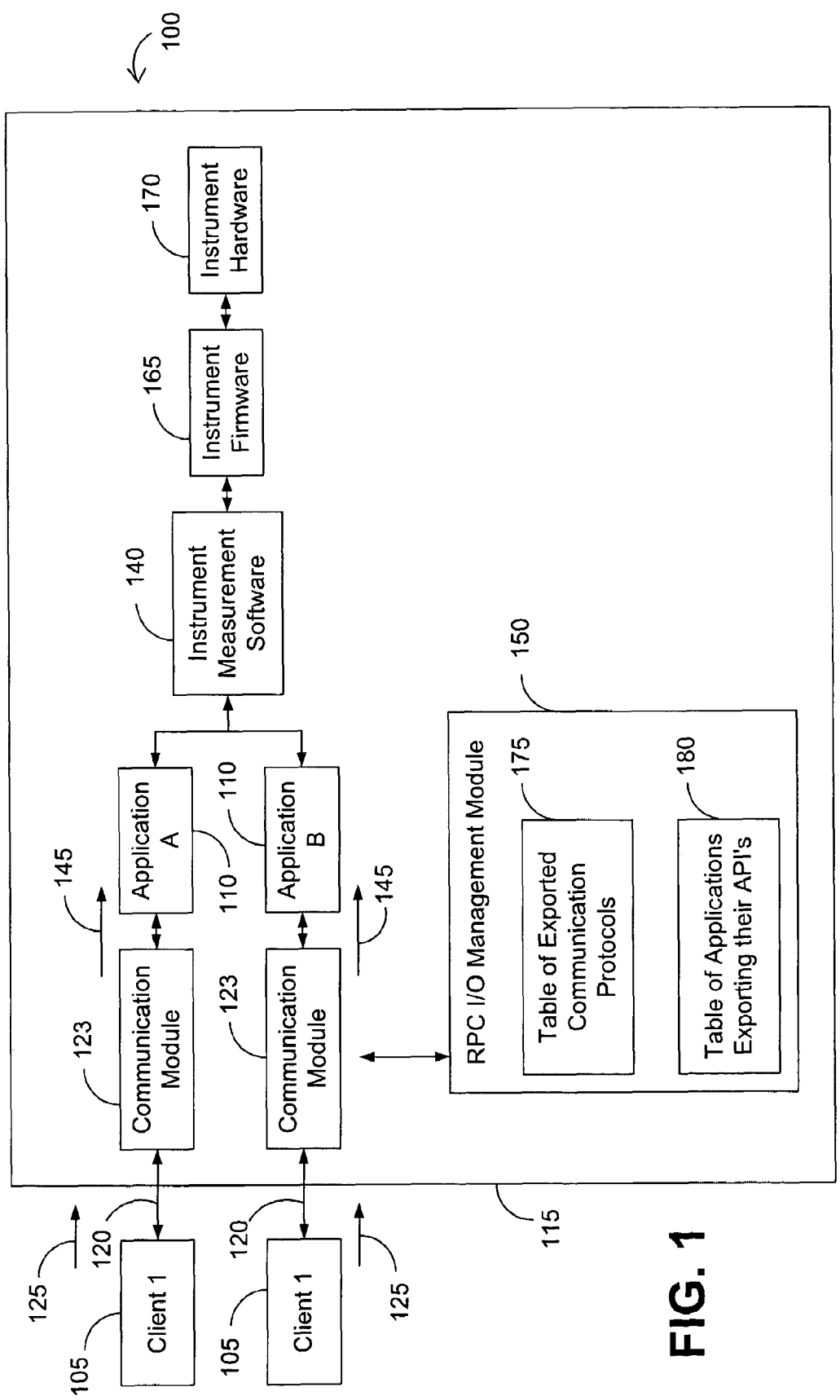
FIG. 1 is a block diagram of a measurement system as described in various representative embodiments.

As shown in the drawings for purposes of illustration, the present patent document relates to novel techniques for the automatic creation of a protocol dependent control path for an instrument application. Such techniques also include the automatic creation of control paths by multiple users wherein the users may issue commands and queries using different protocols.

Application developers for modern systems such as instruments use a variety of protocols for to create software routines for controlling the instrument. Such routines are referred to as Application Program(ming) Interface (API) functions. The application programmers specify the commands (calls) and any associated parameters that are necessary to perform a needed task. By using API's they do not have to address the details of implementation, which may vary from system to system. In effect, the API's form a high-level programming language. These API's can be written in, for example, Sun Microsystems' Java or .NET. Various users or clients may, however, want to make use of these API's via other protocols, as for example Standard Commands for Programmable Instruments (SCPI) which is a commonly used protocol in the Test and Measurement industry. Other client specified protocols, including, Java and .NET, may also be used.

In representative embodiments, techniques are disclosed wherein various communication protocols are registered with a controller. Once registered, the controller can automatically create an appropriate control path with an associated translator enabling a particular client to communicate with and to control an instrument's application even though the communications issued by the client may be written using a protocol that differs from the protocol of the instrument application API's. In other representative embodiments, multiple users, each using a user specific protocol, can access applications on the instrument.

In the following detailed description and in the several figures of the drawings, like elements are identified with like reference numerals.

FIG. 1 is a block diagram of a measurement system 100 as described in various representative embodiments. In the embodiment of FIG. 1, two clients 105 (client 1 and client 2) are each separately connected to two applications 110 (application A and application B), also referred to herein as application modules 110 and application logic modules 110, on an instrument 115 by communication links 120 and communication modules 123, also referred to herein as communication logic modules 123. Each of the clients 105 sends commands 125 to the application 110 on the instrument 115 by means of communication links 120 and communication modules 123.

Commands 125 controlling instrument 115 functions are generically referred to as remote procedure control (RPC) commands 125 and herein as received commands 125. RPC commands 125 are formatted by the client 105 before transmission into a client specific communication protocol 127 (not shown explicitly in the drawings), also referred to herein as a client specific protocol 127. A number of standard sets of program calls or routines referred to as API's are used to control various applications on the instrument 115. The set of API functions which the applications 110 on the instrument 115 has been programmed to understand are written using RPC functions or commands 125 which are resident on the instrument 115 and which are referred to as the instrument resident or instrument native API's. Similarly, the format or grammar used to write these API's is referred to as the native language of the instrument 115. The instrument native API's are formatted in conformance to an application specific protocol 129 (not shown explicitly in the drawings). In order to control the instrument 115, commands 125 reaching instrument measurement software 140 need to conform to the application specific protocol 129. The communication modules 123 translate the client specific communication protocol 127 commands 125 sent to the instrument 115 by the clients 105 into translated commands 145 having translator protocols 128 (not explicitly shown in the drawings) which the application 110 is capable of understanding and reacting appropriately to.

Standard communication protocols are used in various industries. Standard Commands for Programmable Instruments (SCPI) is one such protocol commonly used in the Test and Measurement industry. SCPI comprises a common set of commands that instruments of a particular type will understand. For example, as a general rule, voltmeters and spectrum analyzers will understand particular sets of SCPI commands which control various functions on these instruments. Instrument functionality varies depending upon instrument manufacturer and type. Manufacturers enhance product differentiation by the addition of various capabilities to the instrument. SCPI is coded as an ASCII string and has a hierarchical command structure. At an upper level could be an instruction to select the general function to perform, such as measure or calibrate a system or subsystem. The next level could be a more specific statement of what the function is to perform, for example measure a frequency, voltage, or current in the item selected for measurement. Under voltage, for example, might be the type of voltage, i.e., DC voltage (direct current voltage) or AC voltage (alternating current voltage). A command might be "Measure voltage DC". Each of these items "Measure", "Voltage" and "DC" are considered to be a SCPI node. The collection of all SCPI nodes in an instrument is a SCPI tree. In the instrument, a SCPI parser waits and listens for a SCPI command. When the SCPI parser receives a SCPI command that it understands, it identifies the correct SCPI node that corresponds to the SCPI command and instructs that node to perform the requested function.

However, not all instruments use SCPI as the communication protocol for their resident command language API's, and computers used in the control of instruments do not always use a SCPI command set. There are potentially several different communication protocols that the computer can use to communicate with an instrument. In addition to SCPI, a computer or system could use .NET, Java, CORBA which is a standard of the Object Management Group (OMG), or the like.

In FIG. 1, a remote procedure control (RPC) input/output (I/O) management module 150, also referred to herein as a management module 150 and as a management logic module 150, identifies which client specific communication protocol 127 each client 105 is using to communicate with the instrument 115. Following registration of the client specific communication protocols 127 with the RPC I/O management module 150, the RPC I/O management module 150 sets up and appropriately configures associated communication modules 123. Among other tasks, each communication module 123, if necessary, transforms the client specific communication protocol 127 commands 125 that it receives from its associated client 105 into translator protocol 128 translated commands 145 which the application 110 can understand.

The application 110 sends instructions from these translated commands 145 to the instrument measurement software 140 which in turn transfers these instructions to instrument firmware 165. The instrument firmware 165 finally transfers the required instructions to instrument hardware 170 for performing the requested task.

The RPC I/O management module 150 can maintain two internal data structures, a table of exported communication protocols 175 and a table of applications exporting their API's 180. The table of exported communication protocols 175 comprises a list of all the communication protocols supported by the instrument. The exported communication protocols are referred to as "exported" because they are available for use not only on the instrument 115, but on the instrument 115 by the clients 105. In other words, the exported communication protocols are not just available for call by functions internal to the instrument. The table of applications exporting 180 their API's is a table of applications on the instrument 115 that have API's available for use by the clients 105.

Figure 2:
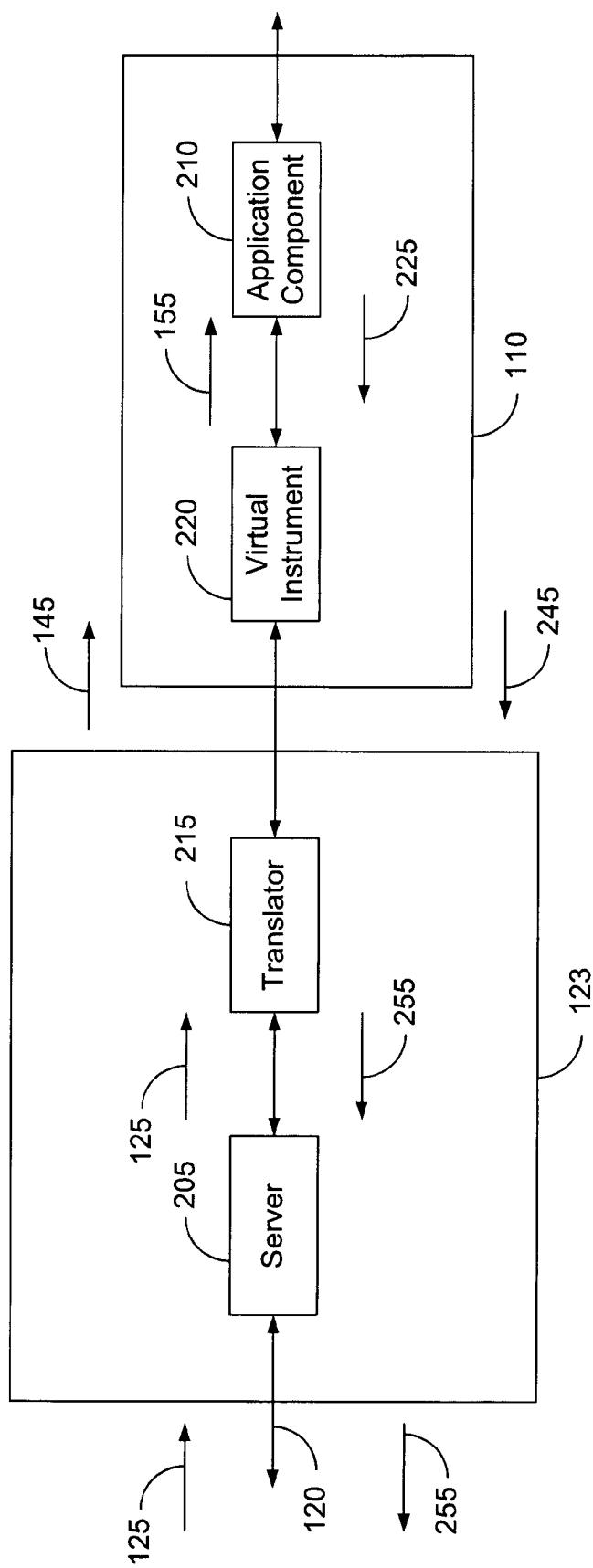
FIG. 2 is a block diagram of an embodiment of part of the measurement system of FIG. 1.

FIG. 2 is a block diagram of an embodiment of part of the measurement system 100 of FIG. 1. In the embodiment of FIG. 2, the communication module 123 comprises a server module 205, also referred to herein as a server module 205 and as a server logic module 205, and a translator 215, also referred to herein as a translator module 215 and as a translator logic module 215. The server module 205 receives commands 125 from its associated client 105 and transfers those commands to the translator module 215. The translator module 215 translates the commands 125 from the associated client 105, which commands 125 have a client specific communication protocol 127, into an appropriate translated command 145, which commands have the translator protocol 128, for reception by the application module 110.

The application module 110 comprises a virtual instrument module 220, also referred to herein as a virtual instrument logic module 220, an interface 220, an interface module 220, and an interface logic module 220, and an application component module 210, also referred to herein as an application component 210 and an application component logic module 210. The virtual instrument module 220 acts as an interface to the application component module 210. It receives the translated command 145 at the input of the virtual instrument 220 and acts as an interface to control the flow of communications between the client 105 and its associated application component 210. If necessary, the virtual instrument module 220 translates the translated command 145 having translator protocol 128 into an application command 155 having an application specific protocol 129 (not explicitly shown in the drawings) which the application component 210 is capable of understanding and reacting appropriately to. The application component module 210 decodes the commands to the instrument measurement software 140. For an implementation in which the translator protocol 128 is the same as the application component specific protocol 129, the translated command 145 is the same as the application command 155. As such, the virtual instrument 220 will not translate the translated command 145 into the application command 155 but will instead transfer the translated command 145 without change to the application component module 210.

Messages 225, referred to herein as application messages 225, can be sent from the application component module 210 to the associated client 105. Messages 225 having application specific protocol 129 are transformed by the virtual instrument 220 into intermediate messages 245 having translator protocol 128. The intermediate messages 245 are then transferred to the translator 215 in the communication module 123. Messages and commands between one of the clients 105 and its associated application 110 are more generally referred to herein as communications.

For an implementation in which the translator protocol 128 is the same as the application specific protocol 129, the intermediate message 245 is the same as the application message 225. As such, the virtual instrument 220 will not translate the application message 225 into the intermediate message 245 but will instead transfer the application message 225 without change to the translator 215 in the communication module 123.

Intermediate messages 245 having translator protocols 128 are transformed by the translator 215 into client messages 255 having the client specific communication protocol 127. The client messages 255 are then transferred to the server 205 in the communication module 123. The server 205 transfers the client messages 255 to the appropriate client 105 via communication link 120. For an implementation in which the translator protocol 128 is the same as the client specific communication protocol 127, the intermediate message 245 is the same as the client message 255. As such, the translator 215 will not translate the intermediate message 245 into the client message 255 but will instead transfer the intermediate message 245 without change to the server 205 in the communication module 123 for transfer to the associated client 105 via communication link 120.

Figure 3:
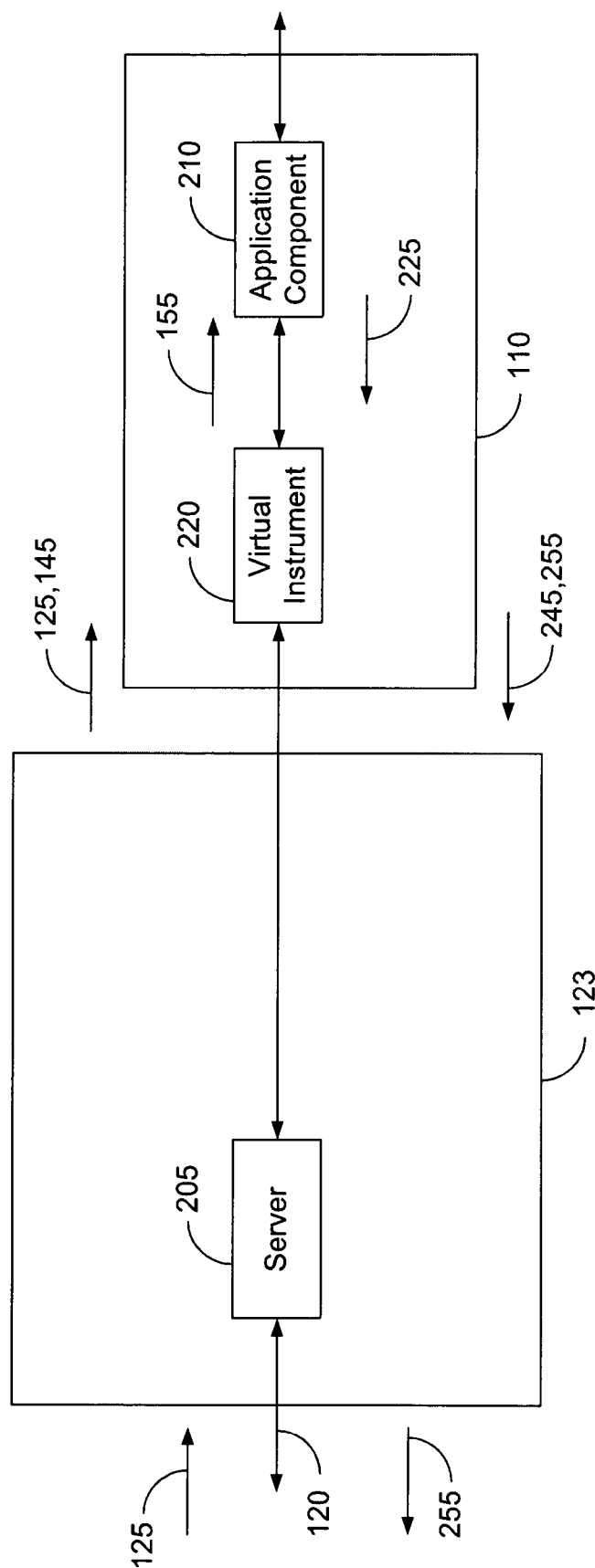
FIG. 3 is a block diagram of another embodiment of part of the measurement system of FIG. 1.

FIG. 3 is a block diagram of another embodiment of part of the measurement system 100 of FIG. 1. In the embodiment of FIG. 3, the communication module 123 comprises a server module 205. The server module 205 receives commands 125 from its associated client 105 and transfers those commands to the application module 110. The application module 110 comprises a virtual instrument module 220 and an application component module 210. The virtual instrument module 220 acts as an interface for the application component module 210. It receives the command 125 which is the same as the translated command 145 at the input of the virtual instrument 220 and acts as an interface to control the flow of communications between the client 105 and its associated application component 210.

If necessary, the virtual instrument module 220 translates the client command 125 having client specific communication protocol 127 into application command 155 having application specific protocol 129 which the application component 210 is capable of understanding and reacting appropriately to. The application component module 210 decodes the application command 155 and connects to the instrument measurement software 140. For an implementation in which the translator protocol 128 is the same as the application specific protocol 129, the client command 125 is the same as the application command 155. As such, the virtual instrument 220 will not translate the client command 125 into the application command 155 but will instead transfer the client command 125 without change to the application component module 210.

Application messages 225 can be sent from the application component module 210 to the associated client 105. Messages 225 having application specific protocol 129 are transformed by the virtual instrument 220 into intermediate messages 245 having translator protocol 128. The intermediate messages 245 are then transferred to the server 205 in the communication module 123.

For an implementation in which the translator protocol 128 is the same as the application specific protocol 129, the intermediate message 245 is the same as the application message 225. As such, the virtual instrument 220 will not translate the application message 225 into the intermediate message 245 but will instead transfer the application message 225 without change to the server 205 in the communication module 123.

Since this embodiment does not include a translator 215, the intermediate message 245 is the same as the client message 255. As such, the server will transfer the intermediate message 245 (i.e., the client message 255) without change to its associated client 105 via communication link 120.

Figure 4:
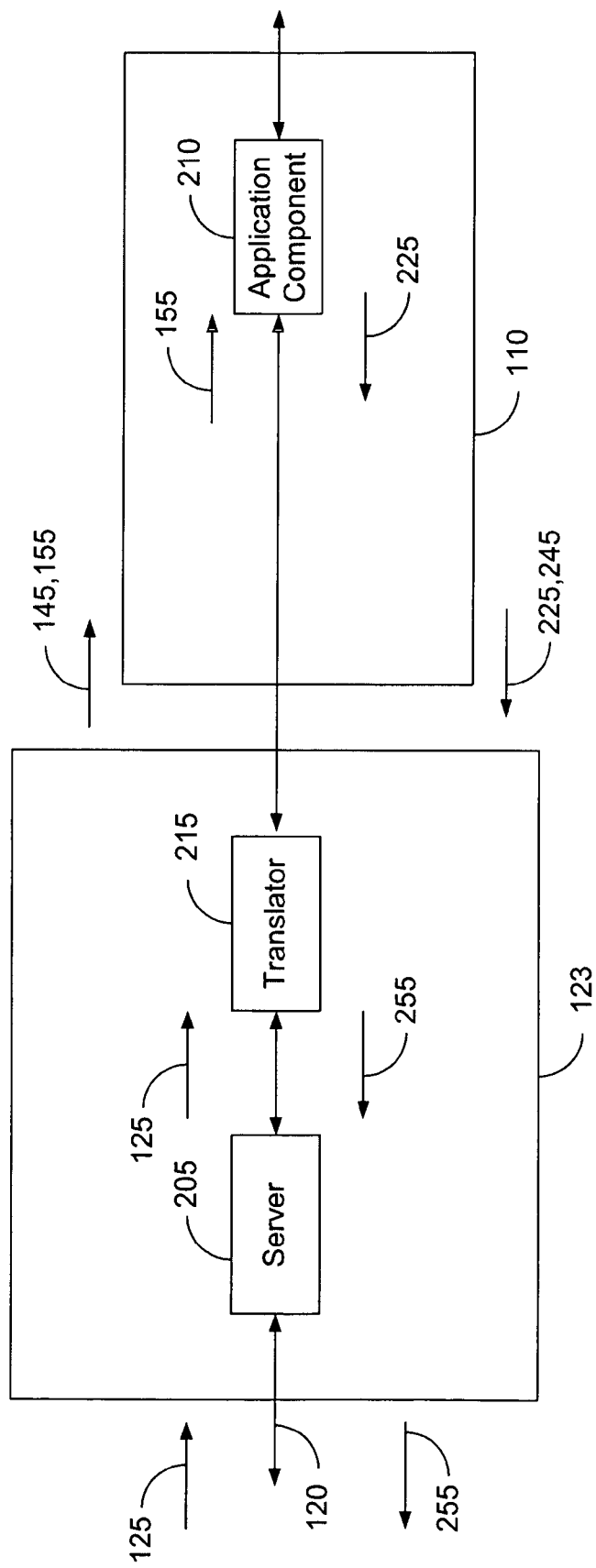
FIG. 4 is a block diagram of still another embodiment of part of the measurement system of FIG. 1.

FIG. 4 is a block diagram of still another embodiment of part of the measurement system 100 of FIG. 1. In the embodiment of FIG. 4, the communication module 123 comprises the server module 205 and the translator 215. The server module 205 receives commands 125 from its associated client 105 and transfers those commands to the translator module 215. The translator module 215 translates the commands 125 from the associated client 105, which commands 125 have a client specific communication protocol 127, into an appropriate translated command 145, which commands have the translator protocol 128, for reception by the application module 110.

The application module 110 comprises the application component module 210. The application component module 210 decodes the translated command 145 and connects to the instrument measurement software 140. Since in this implementation the translator protocol 128 is the same as the application specific protocol 129, the translated command 145 is the same as the application command 155. As such, the translated command 145 will be transferred without change to the application component module 210.

Messages 225, referred to herein as application messages 225, can be sent from the application component module 210 to the associated client 105. Since in this embodiment, the application specific protocol 129 is identical to the translator protocol 128. The messages 225 are identical to the intermediate messages 245. The application messages 225 are, therefore, transferred to the translator 215 in the communication module 123.

Application messages 225 having application specific protocols 129 are transformed by the translator 215 into client messages 255 having the client specific communication protocol 127. The client messages 255 are then transferred to the server 205 in the communication module 123. The server 205 transfers the client messages 255 to the appropriate client 105 via communication link 120.

For an implementation in which the translator protocol 128 is the same as the client specific communication protocol 127, the application message 225 is the same as the client message 255. As such, the translator 215 will not translate the application message 225 into the client message 255 but will instead transfer the application message 225 without change to the server 205 in the communication module 123 for transfer to the associated client 105 via communication link 120.

Figure 5:
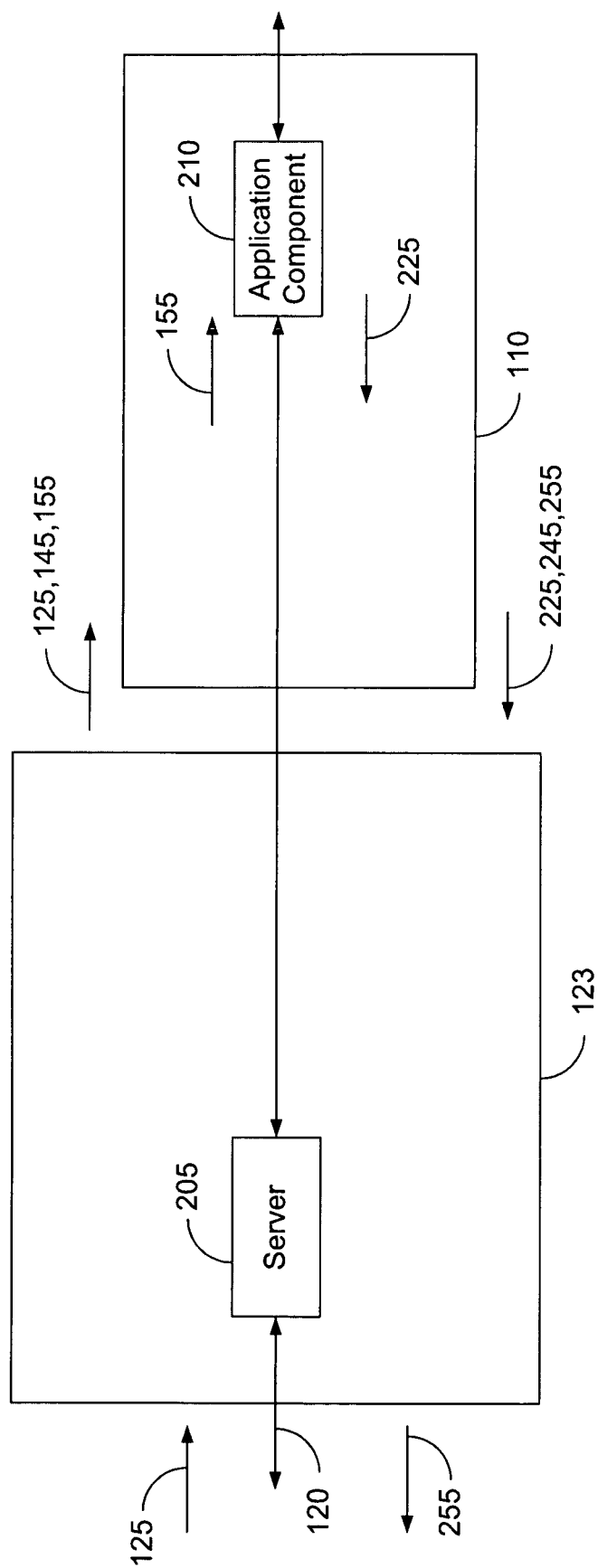
FIG. 5 is a block diagram of yet another embodiment of part of the measurement system of FIG. 1.

FIG. 5 is a block diagram of yet another embodiment of part of the measurement system 100 of FIG. 1. In the embodiment of FIG. 5, the communication module 123 comprises the server module 205. The server module 205 receives commands 125 from its associated client 105 and transfers those commands to the application module 110.

The application module 110 comprises the application component module 210. The application component module 210 decodes the command 125 and connects to the instrument measurement software 140. Since in this implementation the client specific protocol 127, the translator protocol 128, and the application specific protocol 129 are identical, the application command 155 is the same as the command 125 received from the associated client 105. As such, the command 125 will be transferred without change to the application component module 210.

Application messages 225 can be sent from the application component module 210 to the associated client 105. Since in this embodiment, the application specific protocol 129, the translator protocol 128, and the client specific communication protocol 127 are identical, client messages 255 are identical to the intermediate messages 245 and to the application messages 225. The application messages 225 are, therefore, transferred to the client 105 via the server module 205 in the communication module 123. The server 205 transfers the application messages 225 to the appropriate client 105 via communication link 120.

Figure 6:
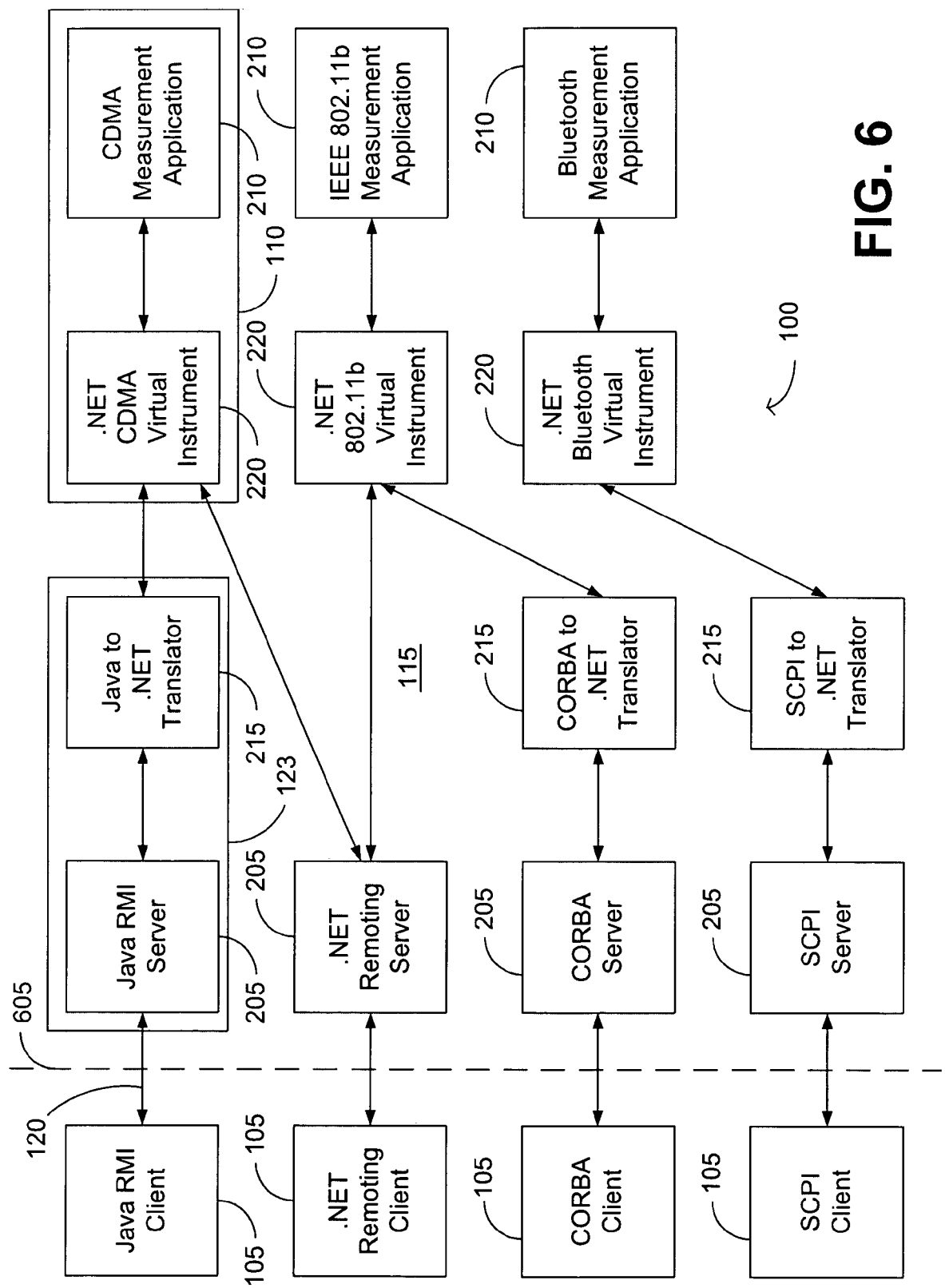
FIG. 6 is a block diagram of the measurement system as described in various representative embodiments.

FIG. 6 is a block diagram of the measurement system 100 as described in various representative embodiments. In the embodiment of FIG. 6, clients 105 external to the instrument 115 are shown to the left of instrument boundary 605. All blocks to the right of the instrument boundary 605 are a part of the instrument 115. In the example implementation of FIG. 6, the clients 105 of the measurement system 100 are implemented as Java RMI Client 105, .NET Remoting Client 105, CORBA Client 105, and SCPI Client 105 with each having their own client specific communication protocol 127. Servers 205 are implemented as Java RMI Server 205, .NET Remoting Server 205, CORBA Server 205, and SCPI Server 205. Translators 215 are implemented as Java to .NET Translator 215, CORBA to .NET Translator 215, and SCPI to .NET Translator 215. Virtual instruments 220 are implemented as .NET CDMA Virtual Instrument 220, .NET 802.11b Virtual Instrument 220, and .NET Bluetooth Virtual Instrument 220. And, application components 210 are implemented as CDMA Measurement Application 210, IEEE 802.11b Measurement Application 210, and Bluetooth Measurement Application 210. Communication links 120 connect clients 105 with their respective servers 205 on the instrument 115. For clarity of illustration, only one of the communication links 120 is identified by number. Also, only one of the communication modules 123 and only one of the applications 110 are explicitly shown and identified by number in FIG. 6.

In the following discussion, it is assumed that communications to and from the application components 210 in the implementation of FIG. 6 are in accordance with the .NET protocol. As such, translations of these communications are not required by the virtual instruments 220 for proper system function.

As an example, Java RMI Client 105 communicates with Java RMI Server 205 via one of the communication links 120 using commands 125 and client messages 255 which conform to the Java protocol. Java RMI Server 205 transfers RPC commands 125 in the Java protocol to the Java to .NET Translator 215. The Java to .NET Translator 215 translates those commands 125 in the Java protocol into translated commands 145 which conform to the .NET protocol. The Java to .NET Translator 215 transfers those translated commands 145 in the .NET protocol to the .NET CDMA Virtual Instrument 220. The .NET CDMA Virtual Instrument 220 then uses those translated commands 145 in the .NET protocol to control the CDMA Measurement Application 210.

In another communication path, the .NET Remoting Client 105 communicates with .NET Remoting Server 205 via one of the communication links 120 using commands 125 and client messages 255 which conform to the .NET protocol. For commands 125 intended for the CDMA measurement application 210, the .NET Remoting Server 205 transfers RPC commands 125 in the .NET protocol to the .NET CDMA Virtual Instrument 220. The .NET CDMA Virtual Instrument 220 then uses those translated commands 145 in the .NET protocol to control the CDMA Measurement Application 210. Since the commands 125 are in the .NET protocol when received by the .NET Remoting Server 205, and since the protocol which the .NET CDMA Virtual Instrument expects and understands is the .NET protocol, commands 125 do not pass through a translator 215. For commands 125 intended for the IEEE 802.11b measurement application, the .NET Remoting Server 205 transfers RPC commands 125 in the .NET protocol to the .NET 802.11b virtual instrument 220. The .NET 802.11b virtual instrument 220 then uses those translated commands 145 in the .NET protocol to control the IEEE 802.11b measurement application 210. Since the commands 125 are in the .NET protocol when received by the .NET Remoting Server 205, and since the protocol which the IEEE 802.11b measurement application 210 expects is the .NET protocol or the commands 125 are converted to the appropriate protocol by the .NET 802.11b virtual instrument 220, commands 125 do not pass through a translator 215.

And, the CORBA Client 105 communicates with CORBA Server 205 via one of the communication links 120 using commands 125 and client messages 255 which conform to the CORBA protocol. CORBA Server 205 transfers RPC commands 125 in the CORBA protocol to the CORBA to .NET Translator 215. The CORBA to .NET Translator 215 translates those commands 125 in the CORBA protocol into translated commands 145 which conform to the .NET protocol. The CORBA to .NET Translator 215 transfers those translated commands 145 in the .NET protocol to the .NET 802.11b Virtual Instrument 220. The .NET 802.11b Virtual Instrument 220 then uses those translated commands 145 in the .NET protocol to control the IEEE 802.11b Measurement Application 210.

Also, the SCPI Client 105 communicates with SCPI Server 205 via one of the communication links 120 using commands 125 and client messages 255 which conform to the SCPI protocol. SCPI Server 205 transfers RPC commands 125 in the SCPI protocol to the SCPI to .NET Translator 215. The SCPI to .NET Translator 215 translates those commands 125 in the SCPI protocol into translated commands 145 which conform to the .NET protocol. The SCPI to .NET Translator 215 transfers those translated commands 145 in the .NET protocol to the .NET Bluetooth Virtual Instrument 220. The .NET Bluetooth Virtual Instrument 220 then uses those translated commands 145 in the .NET protocol to control the Bluetooth Measurement Application 210.

Messages 225 generated by actions in the CDMA Measurement Application 210 related to tasks for the Java RMI Client 105 are transferred in the .NET protocol from the CDMA Measurement Application 210 to the .NET CDMA Virtual Instrument 220 wherein, if necessary, the messages 225 are converted to intermediate messages 245. The .NET CDMA Virtual Instrument 220 then transfers the intermediate messages 245 to the Java to .NET Translator 215. The Java to .NET Translator 215 translates those intermediate messages 245 into client messages 255 which conform to the Java protocol. The Java to .NET Translator 215 transfers these 255 in the Java protocol to the Java RMI Server 205. The Java RMI Server 205 then transfers those messages 255 in the Java protocol to the Java RMI Client 105 via one of the communication links 120.

In another communication path, messages 225 generated by actions in the CDMA Measurement Application 210 related to tasks for the .NET Remoting Client 105 are transferred in the .NET protocol from the .NET CDMA Virtual Instrument 220 to the to the .NET Remoting Server 205. The .NET Remoting Server 205 then transfers those messages 225 in the .NET protocol to the .NET Remoting Client 105 via one of the communication links 120.

And, messages 225 generated by actions in the IEEE 802.11b Measurement Application 210 related to tasks for the .NET Remoting Client 105 are transferred in the .NET protocol from the .NET 801.11b Virtual Instrument 220 to the to the .NET Remoting Server 205. The .NET Remoting Server 205 then transfers those messages 245 in the .NET protocol to the .NET Remoting Client 105 via one of the communication links 120.

Also, messages 225 generated by actions in the CDMA Measurement Application 210 related to tasks for the CORBA Client 105 are transferred in the .NET protocol from the IEEE 802.11b Measurement Application 210 to the .NET 802.11b Virtual Instrument 220 wherein, if necessary, the messages 225 are converted to intermediate messages 245. The .NET 802.11b Virtual Instrument 220 then transfers the intermediate messages 245 to the CORBA to .NET Translator 215. The CORBA to .NET Translator 215 translates those intermediate messages 245 into client messages 255 which conform to the CORBA protocol. The CORBA to .NET Translator 215 transfers these client messages 255 in the CORBA protocol to the CORBA Server 205. The CORBA Server 205 then transfers those messages 255 in the CORBA protocol to the CORBA Client 105 via one of the communication links 120.

In addition, messages 225 generated by actions in the Bluetooth Measurement Application 210 related to tasks for the SCPI Client 105 are transferred in the .NET protocol from the Bluetooth Measurement Application 210 to the .NET Bluetooth Virtual Instrument 220 wherein, if necessary, the messages 225 are converted to intermediate messages 245. The .NET Bluetooth Virtual Instrument 220 then transfers the intermediate messages 245 to the SCPI to .NET Translator 215. The SCPI to .NET Translator 215 translates those intermediate messages 245 into client messages 255 which conform to the SCPI protocol. The SCPI to .NET Translator 215 transfers these 255 in the SCPI protocol to the SCPI Server 205. The SCPI Server 205 then transfers those messages 255 in the SCPI protocol to the SCPI Client 105 via one of the communication links 120.

Figure 7:
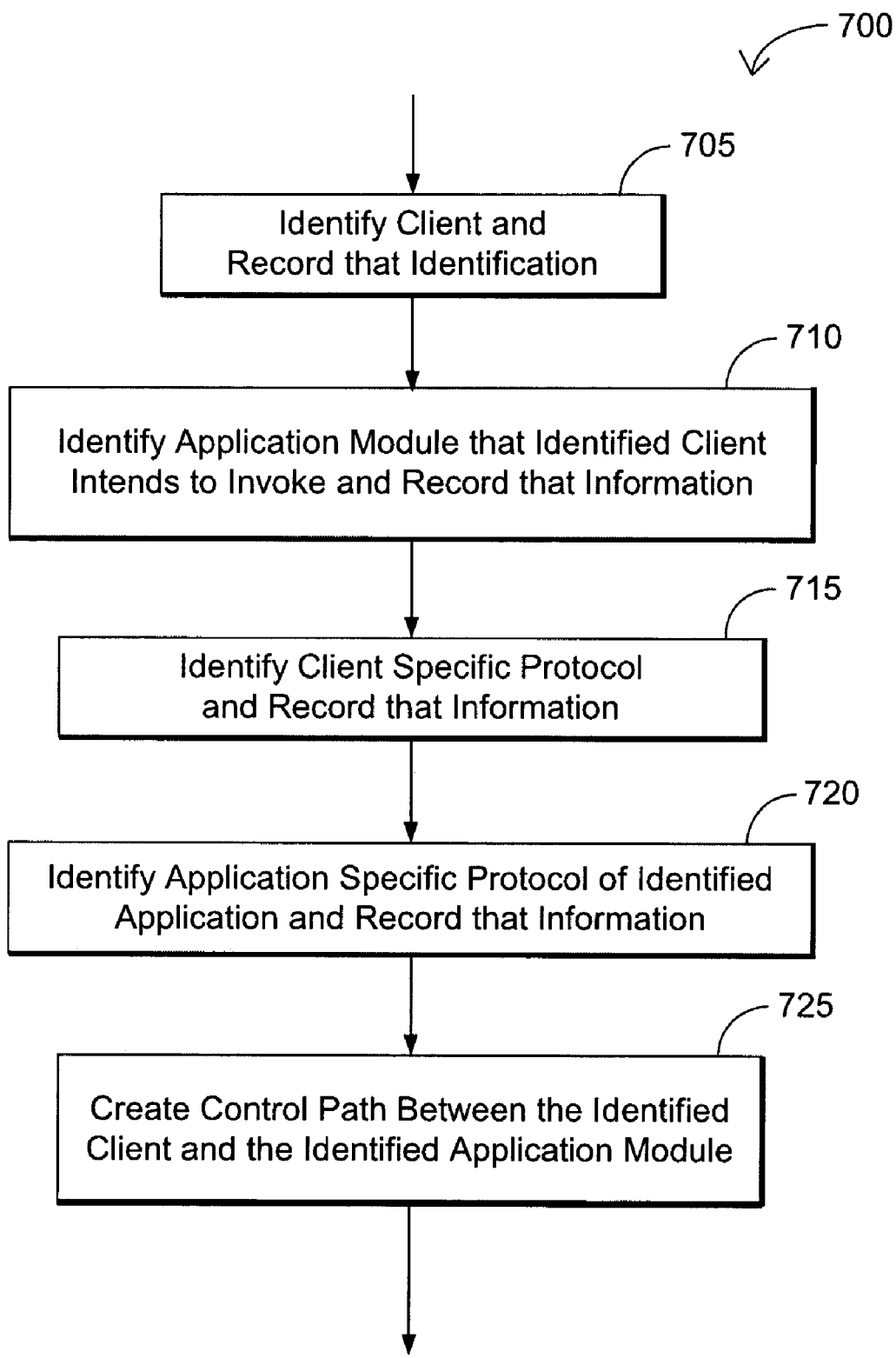
FIG. 7 is a flow chart of a method for creating a control path in a measurement system as described in various representative embodiments.

FIG. 7 is a flow chart of a method 700 for creating a control path in a measurement system as described in various representative embodiments. In block 705 of FIG. 7, the RPC I/O management module 150 obtains client 105 identification from one of the clients 105 intending to invoke an application 110 on the instrument 115 and optionally records that information. Block 705 then transfers control to block 710.

In block 710, the RPC I/O management module 150 obtains identification as to the applications 110 which the identified client 105 intends to invoke and optionally records that information. Block 710 then transfers control to block 715.

In block 715, the RPC I/O management module 150 obtains identification of which client specific communication protocol 127 the commands 125 which may be contained within a client 105 program and messages 255 of the identified client 105 will use for invoking the identified application 110 on the instrument 115 and optionally records that information. Block 715 then transfers control to block 720.

In block 720, the RPC I/O management module 150 obtains identification as to which application specific protocol 129 the identified application 110 understands and communicates in and optionally records that information. Block 720 then transfers control to block 725.

In block 725, the RPC I/O management module 150 creates a control path between the identified client 105 and the application 110 which the identified client 105 intends to invoke and optionally records that information. Block 725 then terminates the process. However for multiple clients, the above process can be repeated for each client 105.

Figure 8:
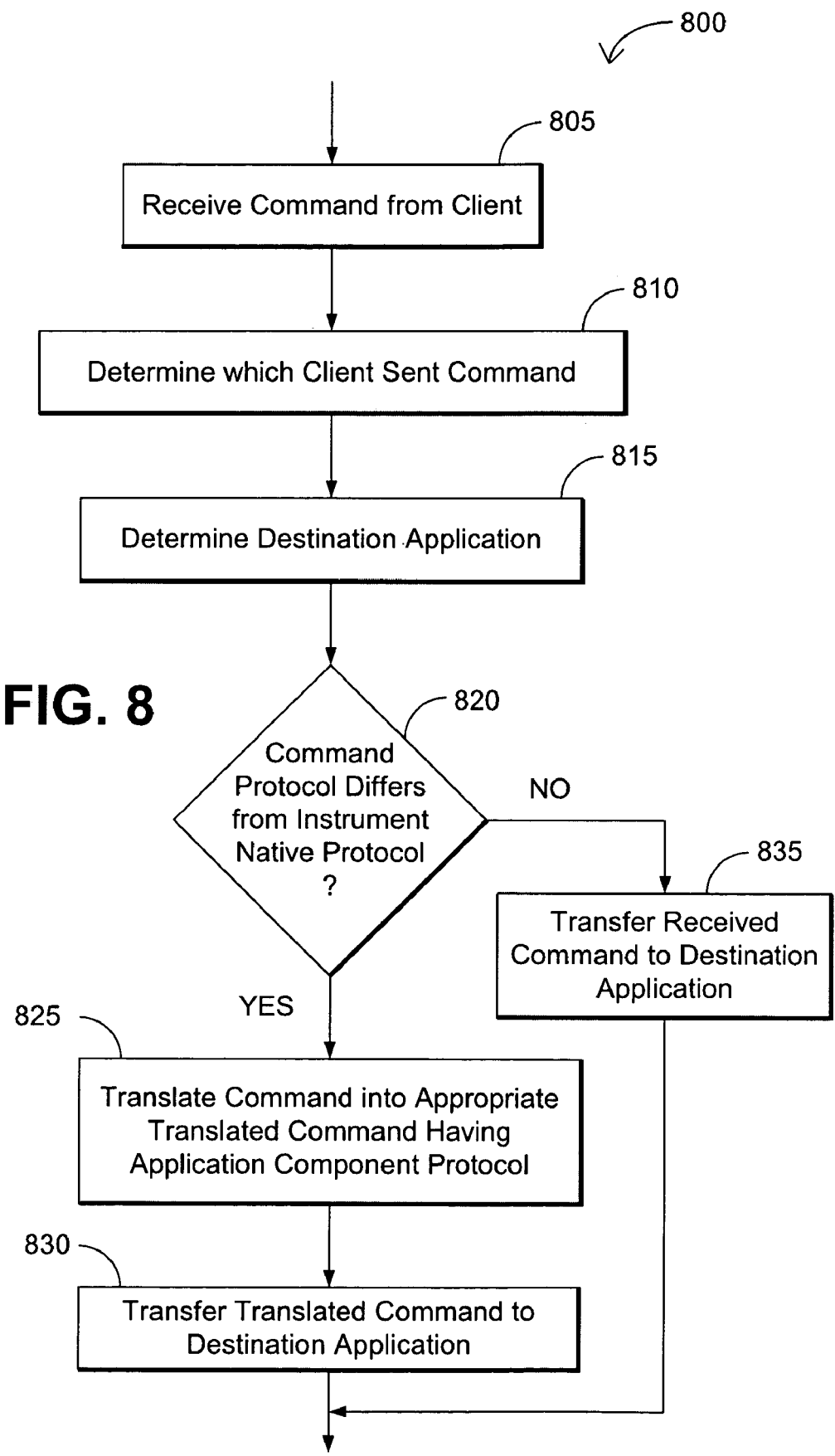
FIG. 8 is a flow chart of a method for measurement system communication as described in various representative embodiments.

FIG. 8 is a flow chart of a method 800 for measurement system communication as described in various representative embodiments. In block 805 of FIG. 8, the command 125 is received from the client 105. The command 125 is typically received by the server module 205. Block 805 then transfers control to block 810.

In block 810, a determination is made as to which client 105 sent the command 125. Information as to which client 105 sent the command 125 is typically contained within the command 125, attached to the command 125, or encapsulating the command 125. The determination as to which client 105 sent the command may be ascertained by the server module 205, the translator module 215, the virtual instrument module 220, the application component 210, and/or other appropriate module. Block 810 then transfers control to block 815.

In block 815, a determination is made as to the destination application 110 and/or application component 210 for the command 125. Information as to the destination application 110 and/or destination application component 210 is typically contained within the command 125, attached to the command 125, or encapsulating the command 125. The determination as to the destination application 110 and/or destination application component 210 can be performed by the server module 205, the translator module 215, the virtual instrument module 220, the application component 210, and/or other appropriate module. Block 815 then transfers control to block 820.

When the protocol of the command 125 as received by the instrument 115 (the client specific communication protocol 127) differs from the native application protocol (the translator protocol 128 and/or the application specific protocol 129), block 820 transfers control to block 825. Otherwise, block 820 transfers control to block 835.

In block 825, the command 125 as received from the client 105 is translated into an application command 155 having the native application protocol (the translator protocol 128 or the application specific protocol 129). Block 825 then transfers control to block 830.

In block 830, the application command 155 is transferred to the destination application component 210, and block 830 then terminates the process.

In block 835, the received command 125 is transferred to the destination application component 210, and block 835 then terminates the process.

Figure 9:
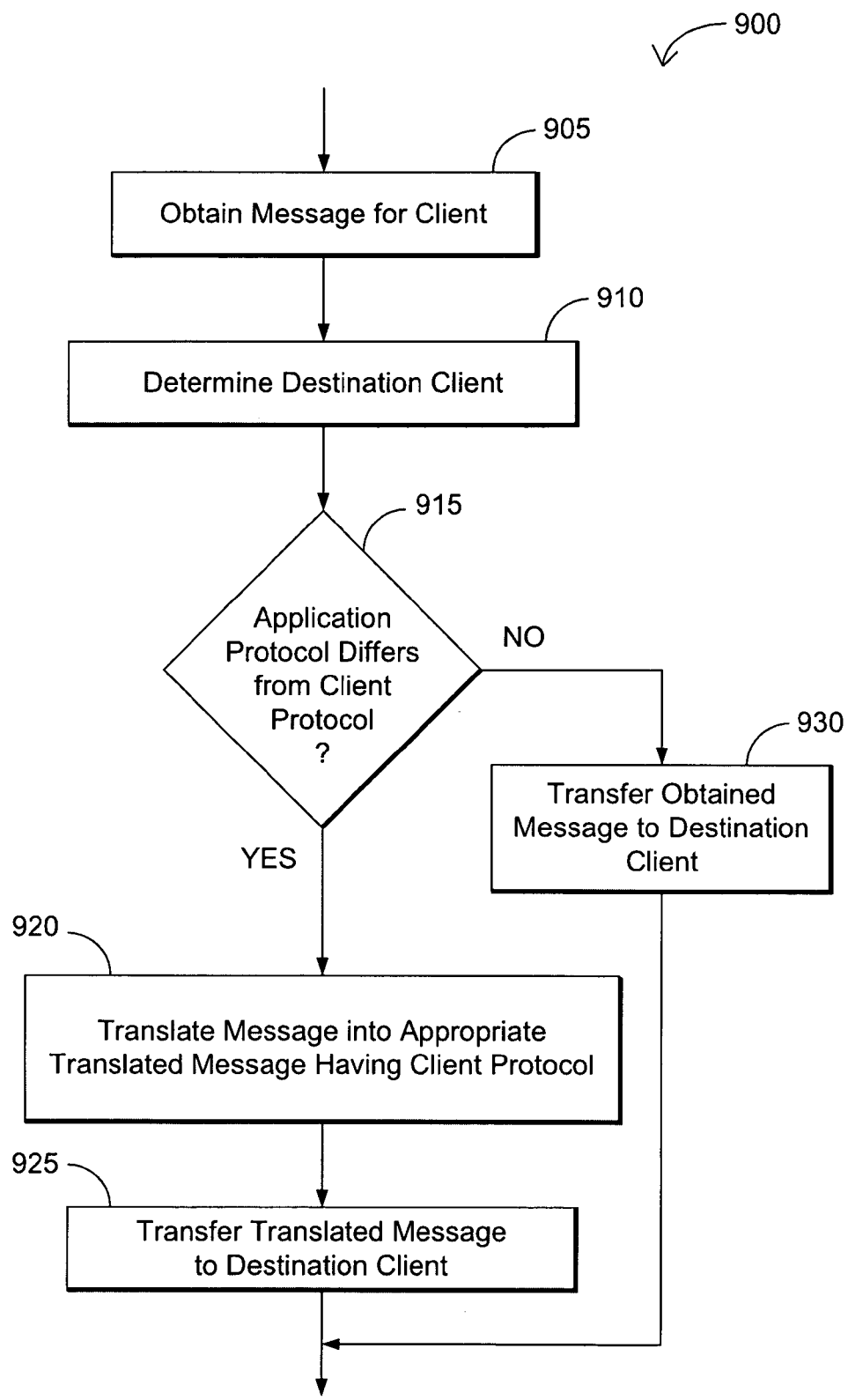
FIG. 9 is a flow chart of another method for measurement system communication as described in various representative embodiments.

FIG. 9 is a flow chart of another method 900 for measurement system communication as described in various representative embodiments. In block 905 of FIG. 9, the message 225 is obtained. The message 225 is typically obtained from the application component module 210 or the virtual instrument module 220. Block 905 then transfers control to block 910.

In block 910, a determination is made as to which client 105 the message 225 will be sent. Information as to which client 105 to send the message 225 is typically contained within the message 225, attached to the message 225, or encapsulating the message 225. The determination as to which client 105 to send the message 225 to may be ascertained by the server module 205, the translator module 215, the virtual instrument module 220, the application component 210, and/or other appropriate module. Block 910 then transfers control to block 915.

When the protocol of the message 225 as obtained by the application component 210 (the application specific protocol 129) differs from the client protocol (the client specific communication protocol 127), block 915 transfers control to block 920. Otherwise, block 915 transfers control to block 930.

In block 920, the message 225 as obtained is translated into a client message 255 having the client protocol (the client specific communication protocol 127). Block 920 then transfers control to block 925.

In block 925, the client message 255 is transferred to the destination client 105, and block 925 then terminates the process.

In block 930, the client message 255 is transferred to the destination client 105, and block 930 then terminates the process.

In representative embodiments, the determination of which clients 105 are connected to the instrument 115, which application modules 110 are available for use on the instrument 115, and which different types of protocols each of these items uses is performed automatically. Typically the commands 125 are method calls that the clients 105 send to the instrument 115. These method calls are calls to API's. The API's are then executed on the instrument 115. The clients 105 can be computers and can be located on the instrument 115 or remote from it.

A given instrument 115 may comprise several different functional capabilities which may be individually purchased by a customer. Such functional capabilities can be turned on/off as, for example, a license is purchased by the user or the license expires. In addition, future applications can be developed after shipment of the instrument to the customer. This added functionality can be installed as such functions are developed by the manufacturer and obtained by the user.

Referring to FIG. 1, in representative embodiments it is the RPC I/O management module 150 that creates the interface between the type of client (client 1 and client 2) and the functionality of the instrument 115 (application A and application B). Application A and application B are the sets of functionality that are inside the instrument 115. The RPC I/O Management module 150 automatically creates the connections between the various clients 105 and the various application components 210, i.e., the RCP I/O management module 150 creates the control paths. A control path is the path that commands 125 and messages 225 take between one of the clients 105 and the application 110 that the client 105 invokes. These control paths can be created dynamically. They can be created when the instrument 115 is powered-up and/or during operation as clients 105 and/or application components 210 are added to the measurement system 100. The RPC I/O management module 150 is capable of automatically detecting which clients 105 and their types (their protocols), and which application components 210 are available for use on the instrument 115. In essence, the RPC I/O management module 150 can permit use of any of a set of application components 210 on the instrument 115 by any of a set of clients 105 connected to the instrument 115.

As is the case, in many data-processing products, the measurement system 100 may be implemented as a combination of hardware and software components. Moreover, the functionality required for implementing various embodiments may be stored on computer-readable media (such as, but not limited to, floppy disks, conventional hard disks, DVD's, CD-ROM's, Flash ROM's, nonvolatile ROM, and RAM) to be used in programming an information-processing apparatus (e.g., a personal computer and/or instrument) to perform in accordance with the embodiments.

The term "program storage medium" is broadly defined herein to include any kind of computer memory such as, but not limited to, floppy disks, conventional hard disks, DVD's, CD's, Flash ROM's, nonvolatile ROM, and RAM.

In summary, techniques are disclosed in representative embodiments herein wherein various communication protocols are registered with a controller. Once registered, the controller can automatically create an appropriate control path with an associated translator enabling a particular client to communicate with and to control an instrument's application even though the communications issued by the client may be written using a protocol that differs from the protocol of the instrument application API's. In other representative embodiments, multiple users, each using a user specific protocol, can access applications on the instrument.

Advantages of the representative embodiments describe herein are that multiple users using multiple protocols can control multiple application components on a single instrument with little or no extra effort by the users. The users may be located on the instrument 115 remotely from it.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A method for creating a protocol dependent control path within an instrument to allow a first client to communicate with the instrument, the method comprising a control path creation protocol comprising:

causing the instrument to identify the first client, wherein the first client is configured to invoke a first instrument application that is part of the instrument and that controls the instrument, the instrument making measurements of signals that are external to the instrument, wherein the first client is configured to communicate with the instrument using a first client specific protocol, and wherein the first instrument application is configured to communicate with the first client using a first instrument application specific protocol;

causing the instrument to identify the first instrument application with which the first client is configured to communicate;

causing the instrument to identify the first client specific protocol;

causing the instrument to identify the first instrument application specific protocol; and causing the instrument to automatically create a control path between the first client and the first instrument application, the control path communicating with the first client using the first client specific protocol and communicating with the first instrument application using the first instrument application specific protocol.

2. The method as recited in claim 1, further comprising:

causing the instrument to record the identification of the first client;

causing the instrument to record the identification of the first instrument application;

causing the instrument to record the identification of the first client specific protocol; and causing the instrument to record the identification of the first instrument application specific protocol.

3. The method as recited in claim 1, wherein the first instrument application specific protocol differs from the first client specific protocol.

4. The method as recited in claim 1, further comprising:

repeating the control path creation protocol for the first client and a second instrument application, wherein the second instrument application is configured to communicate using a second instrument application specific protocol and wherein the second instrument application specific protocol differs from the first instrument application specific protocol.

5. The method as recited in claim 1, further comprising:

repeating the control path creation protocol for a second client and the first instrument application, wherein the second client is configured to communicate using a second client specific protocol and wherein the second client specific protocol differs from the first client specific protocol.

6. The method as recited in claim 1, further comprising:

repeating the control path creation protocol for a second client and a second instrument application, wherein the second client is configured to communicate using a second client specific protocol, wherein the second instrument application is configured to communicate using a second instrument application specific protocol, and wherein the second client specific protocol differs from the first client specific protocol.

7. The method as recited in claim 6, wherein the second instrument application specific protocol differs from the first instrument application specific protocol.

8. A computer readable memory device embodying a computer program, the program causing a computer within an instrument system to:

cause the instrument to obtain identification of a client, wherein the client is configured to invoke an instrument application that controls the instrument, the instrument making measurements of signals that are external to the instrument, wherein the client is configured to communicate with the instrument using a client specific protocol, and wherein the instrument application communicates with the client using an instrument application specific protocol;

cause the instrument to identify the instrument application;

cause the instrument to identify the client specific protocol;

cause the instrument to identify the instrument application specific protocol; and automatically cause the instrument to create a control path between the client and instrument application.

9. The computer readable memory as recited in claim 8, the computer program further causing the computer to:

cause the instrument to record the identification of the client;

cause the instrument to record the identification of the instrument application;

cause the instrument to record the identification of the client specific protocol, and cause the instrument to record the identification of the instrument application specific protocol.

10. The computer readable memory as recited in claim 8, wherein the instrument application specific protocol differs from the client specific protocol.

11. A computer readable memory device embodying a computer program of instructions comprising a first set of instructions causing a computer within an instrument to:

cause the instrument to identify a client, wherein the client is configured to invoke a first instrument application that controls the instrument, the instrument making measurements of signals that are external to the instrument, wherein the client is configured to communicate with the instrument using a client specific protocol, and wherein the first instrument application communicates with the client using a first instrument application specific protocol;

cause the instrument to identify the first instrument application;

cause the instrument to identify the client specific protocol;

cause the instrument to identify the first instrument application specific protocol; and automatically cause the instrument to create a control path between the client and the first instrument application;

the instructions further comprising:

repeating the first set of instructions for the client and a second instrument application, wherein the second instrument application is configured to communicate with the client using a second instrument application specific protocol and wherein the second instrument application specific protocol differs from the first instrument application specific protocol.

12. A computer readable memory device embodying a computer program of instructions comprising a first set of instructions causing a computer within an instrument to:

cause the instrument to identify a first client, wherein the first client is configured to invoke an instrument application that controls the instrument, the instrument making measurements of signals that are external to the instrument, wherein the first client is configured to communicate with the instrument using a first client specific protocol, and wherein the instrument application communicates with the first client using an instrument application specific protocol;

cause the instrument to identify the instrument application;

cause the instrument to identify the first client specific protocol;

cause the instrument to identify the instrument application specific protocol; and automatically cause the instrument to create a control path between the first client and the instrument application;

the instructions further comprising:

repeating the first set of instructions for a second client and the instrument application, wherein the second client is configured to communicate with the instrument using a second client specific protocol and wherein the second client specific protocol differs from the first client specific protocol.

13. A computer readable memory device embodying a computer program of instructions comprising a first set of instructions causing a computer within an instrument system to:

cause the instrument to identify a first client, wherein the first client is configured to invoke a first instrument application that controls the, the instrument making measurements of signals that are external to the instrument, wherein the first client is configured to communicate with the instrument using a first client specific protocol, and wherein the first instrument application communicates with the first client using a first instrument application specific protocol;

cause the instrument to identify the first instrument application;

cause the instrument to identify the first client specific protocol;

cause the instrument to identify the first instrument application specific protocol; and automatically cause the instrument to create a control path between the first client and the first instrument application;

the instructions further comprising:

repeating the first set of instructions for a second client and a second instrument application, wherein the second client is configured to communicate with the instrument using a second client specific protocol, wherein the second instrument application is configured to communicate with clients using a second instrument application specific protocol, and wherein the second client specific protocol differs from the first client specific protocol.

14. The computer readable memory as recited in claim 13, wherein the second instrument application specific protocol differs from the first instrument application specific protocol.

15. An instrument comprising:

a management logic module configured to obtain identification of a first client, to obtain identification of a first instrument application that controls the instrument, the instrument making measurements of signals that are external to the instrument, to obtain identification of a first client specific protocol, to obtain identification of a first instrument application specific protocol, and to automatically create a control path between the first client and the first instrument application, wherein the first client is configured to invoke the first instrument application, wherein the first client is configured to communicate using a client specific protocol, wherein the first instrument application is configured to communicate using the first instrument application specific protocol, and wherein the first instrument application specific protocol differs from the first client specific protocol.

16. The system as recited in claim 15, wherein the control path comprises:

a communication logic module configured to receive communications from the first client which conform to the first client specific protocol, to translate such communications into communications to which the first instrument application is configured to understand and to which the first instrument application is configured to appropriately react, and to transfer the translated communications to the first instrument application.

17. The system as recited in claim 16, wherein the communication logic module comprises:

a server logic module configured to receive the communications from the first client; and a translator logic module configured to receive the communications from the server logic module and to translate the received communications into communications to which the first instrument application is configured to understand and to which the first instrument application is configured to appropriately react, and to transfer the translated communications to the first instrument application.

18. The system as recited in claim 16, wherein the system further comprises:

wherein the first instrument application comprises a virtual instrument and an application component logic module and wherein the virtual instrument is configured to receive communications from the communication logic module and to perform any additional translation of the communications into communications to which the application component logic module is configured to understand and to which the application component logic module is configured to appropriately react, and to transfer such communications to the application component logic module.

19. The system as recited in claim 16, wherein the system further comprises:

an additional communication logic module configured to receive additional communications from an additional client which conform to an additional client specific protocol, to translate such additional communications into communications to which an additional application is configured to understand and to which the additional application is configured to appropriately react, and to transfer the translated additional communications to the additional application.

20. The system as recited in claim 16, wherein the system further comprises:

an additional communication logic module configured to receive additional communications from an additional client which conform to an additional client specific protocol, to translate such additional communications into communications to which the application is configured to understand and to which the application is configured to appropriately react, and to transfer the translated additional communications to the application.

* * * * *